(12) United States Patent
Gorman et al.

(10) Patent No.: US 8,195,915 B2
(45) Date of Patent: Jun. 5, 2012

(54) MECHANISM FOR VISUALIZING MEMORY FRAGMENTATION

(75) Inventors: Mel Gorman, Galway (IE); Andrew P. Whitcroft, London (GB)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 12/040,671

(22) Filed: Feb. 29, 2008

(65) Prior Publication Data

US 2009/0222642 A1    Sep. 3, 2009

(51) Int. Cl.
*G06F 12/00* (2006.01)
(52) U.S. Cl. .......................................... 711/206; 711/207
(58) Field of Classification Search .................... 711/206
See application file for complete search history.

(56) References Cited

U.S. PATENT DOCUMENTS

| | | |
|---|---|---|
| 5,159,678 A | 10/1992 | Wengelski et al. |
| 5,206,950 A | 4/1993 | Geary et al. |
| 5,247,634 A | 9/1993 | Cline et al. |
| 6,701,420 B1 * | 3/2004 | Hamilton et al. ............. 711/170 |
| 6,832,333 B2 | 12/2004 | Johnson et al. |
| 7,165,105 B2 | 1/2007 | Reiner et al. |
| 2005/0050295 A1 | 3/2005 | Noel et al. |
| 2007/0067604 A1 | 3/2007 | Elnozahy et al. |
| 2007/0113036 A1 * | 5/2007 | Gal-Oz ......................... 711/165 |
| 2007/0288719 A1 * | 12/2007 | Cholleti et al. ............... 711/170 |
| 2008/0162830 A1 * | 7/2008 | Marathe et al. ............... 711/154 |
| 2009/0113160 A1 * | 4/2009 | Ferraro ......................... 711/170 |

OTHER PUBLICATIONS

Map Capture Server Regular Maintenance Procedures, Telestream, Mar. 17, 2005, 5 pages.
M. Gorman, VM-Regress: A VM Regression and Benchmarkig Tool for Linux, Apr. 18, 2003, pp. 1-43.
Microsoft Tech Net Note: Disk Defragmenter, <http://www.microsoft.com/technet/prodtechnol/windows2000servireskit/prork/pref_tts_yafw.mspx?mfr=true>, 2007, 2 pages.
IBM Technical Disclosure Bulletin, Run Time Memory Management Algorithm/Supervisor and WatchDog Support Program, vol. 39, No. 04, Apr. 1996, pp. 265-267.

* cited by examiner

*Primary Examiner* — Tuan Thai
*Assistant Examiner* — Ngoc Dinh
(74) *Attorney, Agent, or Firm* — Walter W. Duft

(57) ABSTRACT

A method, system and computer program product for visualizing memory fragmentation in a data processing system includes determining a mobility status of plural memory pages and generating a map display depicting the plural memory pages and the mobility status.

20 Claims, 4 Drawing Sheets

MECHANISM FOR VISUALIZING MEMORY FRAGMENTATION

FIELD OF THE INVENTION

The present invention is directed to memory management in a data processing system. More particularly, the invention is concerned with the external fragmentation of memory arising from page frame allocation.

DESCRIPTION OF THE PRIOR ART

By way of background, physical page allocators in operating systems are subject to problems related to external fragmentation, a phenomenon in which free memory becomes divided into many small pieces over time. This prevents contiguous blocks of memory being allocated for use by consumers that require contiguous memory, such as applications that require large memory pages (also known as huge pages or super pages). In many cases, the extent of fragmentation is only detected when an allocation fails. At that point, it is difficult to determine why the system is currently fragmented and unable to satisfy the allocation.

There are existing tools for outputting information about the memory page frames that are currently free in a data processing system. However, this information is too coarse-grained to allow any conclusions to be drawn regarding memory fragmentation. Also known are memory maps that describe where free blocks of different sizes are located in the physical address space. However, the information necessary to describe why contiguous pages are not free is not available.

An improved technique for visualizing memory fragmentation arising from page frame allocation would be desirable. What is required is a tool that allows memory fragmentation problems to be identified in an efficient manner and without a substantial programming effort. It would be particularly desirable if such a tool could allow the current state of physical memory to be visualized by an operating systems developer. Using such information, the problem regions of memory could be identified and modifications to the page allocator could be implemented and tested. Using conventional techniques, it would be difficult to determine whether modifications to the page allocator are reducing problems related to external fragmentation or not.

SUMMARY OF THE INVENTION

The foregoing problems are solved and an advance in the art is obtained by a method, system and computer program product for visualizing memory fragmentation in a data processing system. According to an exemplary disclosed visualization technique, the mobility status of plural pages of memory is determined and a map display is generated depicting the plural memory pages and their mobility status. The mobility status of each memory page indicates the ability of that page to be reclaimed or to have its data migrated by an operating system to a different physical address region so that the page's memory area can be consolidated with the memory areas of adjacent pages.

According to an exemplary disclosed embodiment, the map display may depict a memory space distribution of the plural memory pages. More particularly, the map display may depict a two-dimensional array of memory page blocks that each represent a contiguous memory area of interest, such as a large page, two large pages, etc. Each of the memory page blocks may be depicted by plural picture elements that each corresponds to one or more of the plural memory pages. The mobility status may be depicted by way of color codes assigned to the picture elements. The mobility status may include the plural memory pages being one or more of pinned, free, movable, reclaimable, movable-under-reclaim, per-cpu, compound, high-order-atomic, on a zone boundary, or a hole. If desired, the mobility status of the plural memory pages could be determined at different times and a video display could be generated that includes plural map displays for the different times in order to illustrate changes in mobility status.

BRIEF DESCRIPTION OF THE DRAWINGS

The foregoing and other features and advantages of the invention will be apparent from the following more particular description of an exemplary embodiment, as illustrated in the accompanying Drawings, in which.

DETAILED DESCRIPTION OF EXEMPLARY EMBODIMENT

Figure 1:
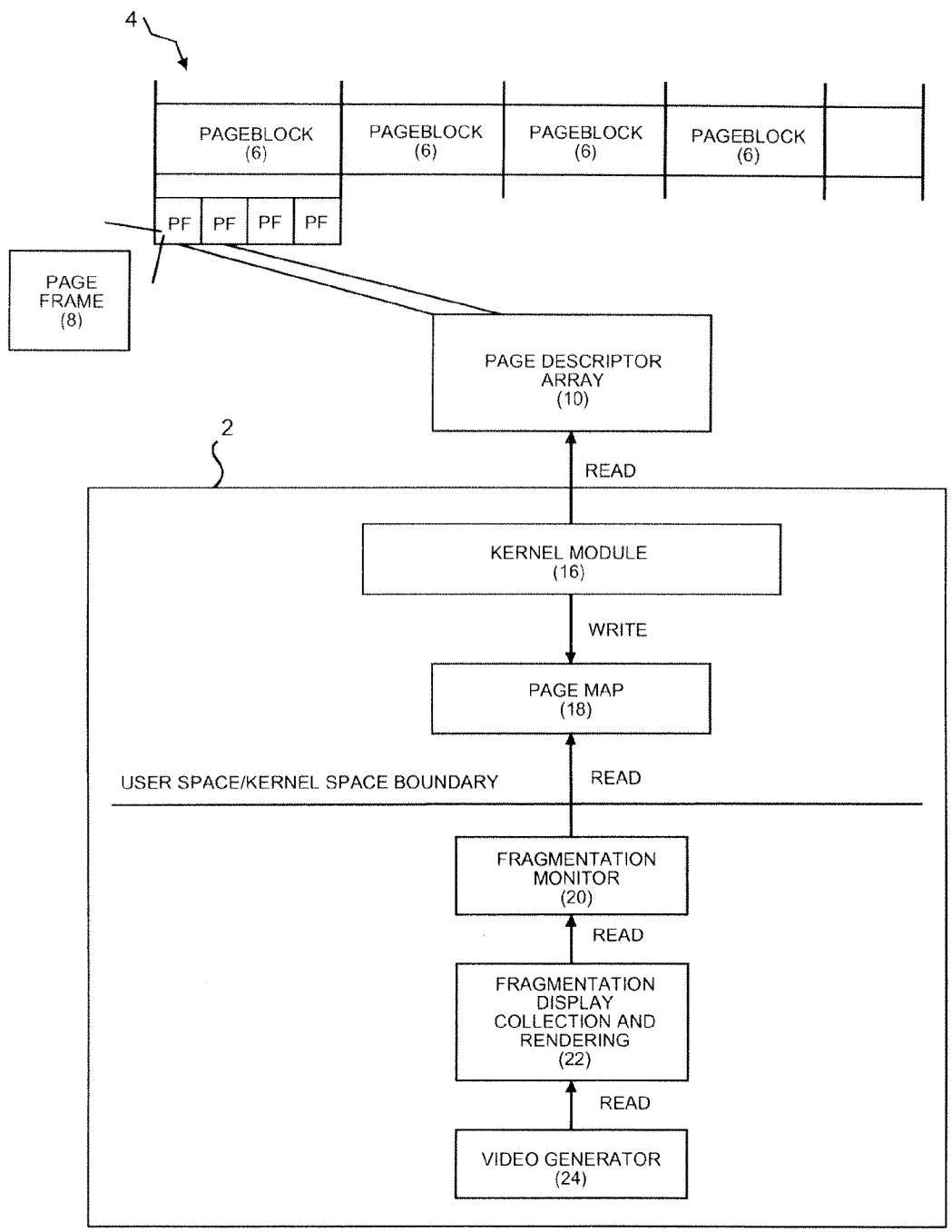
FIG. 1 is a functional block diagram showing exemplary components of a memory fragmentation visualization system.

Turning now to the drawing figures, wherein like reference numerals indicate like elements in all of the several views, FIG. 1 illustrates an exemplary memory fragmentation visualization system 2 that may be used to monitor computer memory usage. A portion of the memory to be analyzed is shown by reference numeral 4. The memory 4 is arranged into a set of memory page blocks 6, each of which comprises a plurality of memory page frames 8 (hereinafter referred to as "pages"). The pages 8 of each memory page block are contiguous, meaning that their memory areas have sequential memory addresses that collectively form the single continuous address range represented by the memory page block 6 to which they belong.

Each memory page block 6 may represent a particular size of contiguous memory area that is of interest, such as a large page, two large pages, etc. As is conventionally known, a large page (also known as a huge page or a super page) represents a unit of memory that comprises a plurality of standard memory pages. A standard memory page is the smallest unit of memory that is available for allocation in a virtual memory system. In many computer systems, the size of a standard page is 4 KB, but other (smaller or larger) sizes are also used. In FIG. 1, the pages 8 may be standard memory pages. Large pages provide the advantage of increasing translation look-aside buffer (TLB) coverage (i.e., the maximum amount of memory that can be addressed without incurring a TLB miss). This reduces the costly TLB misses that arise when a memory request requires a lookup to a virtual-to-physical mapping that the TLB does not presently cache. Large pages may be dynamically allocated at run time by consolidating a run of contiguous standard pages that are currently unallocated and available for consolidation. If the memory if fragmented due to pages that cannot be consolidated being interspersed with pages that can, the ability to create large pages may be severely hampered, resulting in system performance degradation.

The system 2 categorizes the pages 8 based on their mobility status, which is the ability of each page to be reclaimed or to have its data migrated by an operating system (not shown) around the physical address space of the memory 4. Such reclamation and migration allows a page's memory area to be consolidated with the memory areas of adjacent pages. The mobility status of each page 8 may be determined from an array of page descriptors 10 that is conventionally maintained by an operating system. Using techniques described in more detail below, the mobility status information for all of the pages 8 may be exported by the operating system (e.g., via a special file) for later analysis. A visual map display may be rendered based on the exported information that identifies (e.g., using color codes) the pages 8 based on their mobility. If the data is collected at regular intervals, a video may also be rendered showing how the operating system distributes pages of different types over time.

Figure 2:
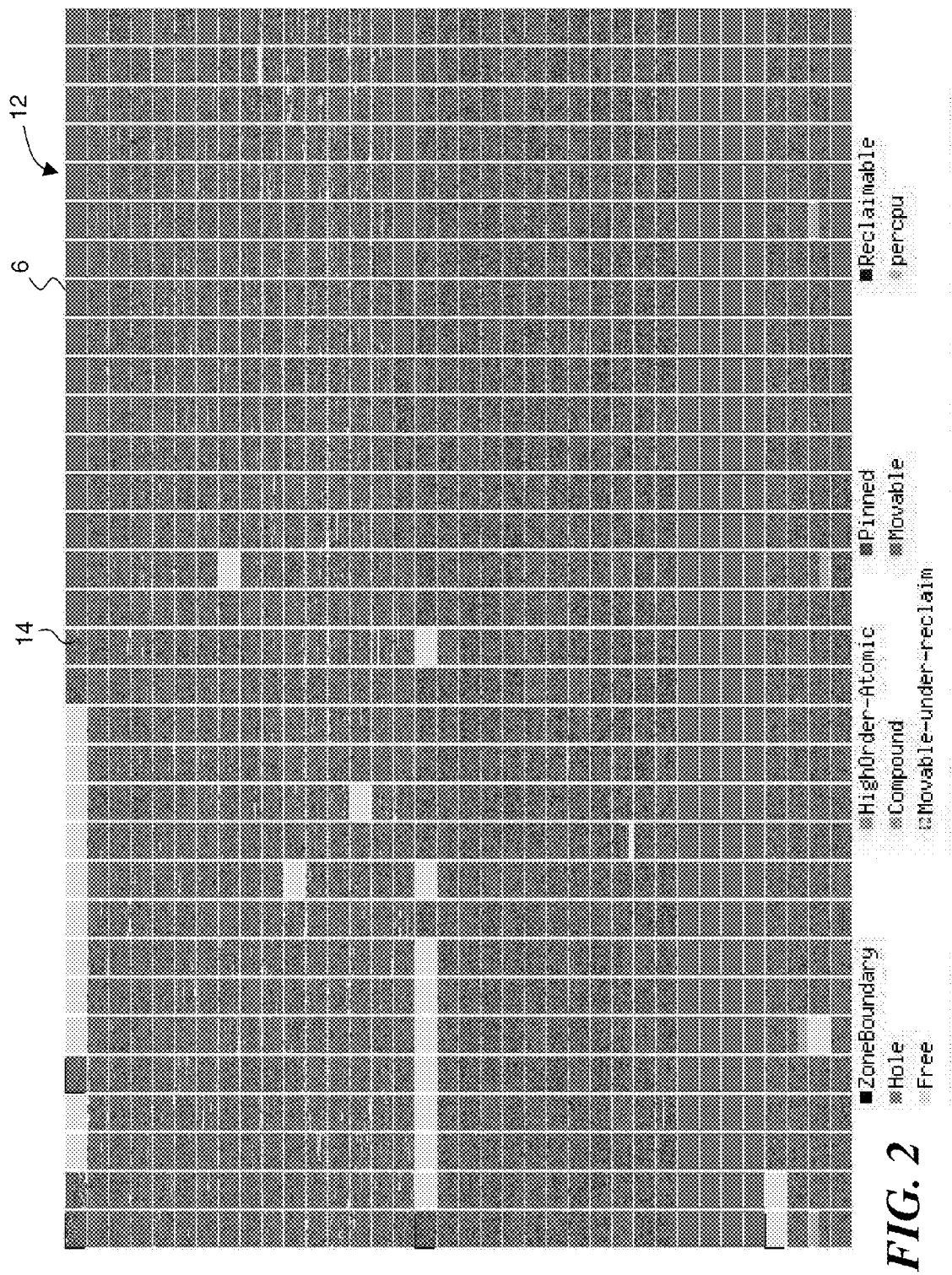
FIG. 2 is an exemplary map display generated by the memory fragmentation visualization system of FIG. 1.

An exemplary visual map display is shown by reference numeral 12 in FIG. 2. The map display 12 depicts a two-dimensional array of all memory page blocks 6 situated within the memory 4 of FIG. 1. For convenience, only one of the memory blocks 6 is marked by the reference numeral "6." In FIG. 2, each of the memory page blocks 6 in the map display 12 is depicted by plural picture elements 14. For convenience, only one of the picture elements is marked by the reference numeral "14." Each picture element 14 is used to represent one of the pages 8. However, some multiple of the picture elements (e.g., 2, 3, 4, etc.) 14 could also be used to represent a single page 8, depending on the size of the map display 12. The mobility status information may be depicted by way of color codes assigned to the picture elements 14. Exemplary mobility status conditions that may be associated with a page 8 may include pinned, free, movable, reclaimable, movable-under-reclaim, per-cpu or a hole. For Linux® implementations, additional mobility status conditions would include compound, high-order-atomic or on-a-zone boundary. All of the foregoing mobility status conditions are well known in the art and will not be further described herein. The legend appearing above the map display 12 associates different map colors with each of the above mobility status conditions. Memory page blocks 6 that are all one color are unfragmented. Memory page blocks 6 that are speckled include pages 8 of different mobility type and are thus fragmented to some degree. In the map display 12, there are a large number of speckled page blocks 6, indicating that fragmentation is occurring and that large page reservation problems may arise in the future.

Referring back to FIG. 1, a conventional virtual memory operating system maintains a page descriptor data structure for each physical page frame in the system. As mentioned above, reference numeral 10 represents an array of such page descriptors. The page descriptor for a given page 8 contains information about the page, such as its reference count and pointers to linked lists it belongs to. Importantly, the information contained in the page descriptor can be used to determine mobility status. The system 2 may be implemented to read the page descriptors in the array 10 and use the information therein to categorize each page 8 based on its ability to be reclaimed or migrated around the physical address space (i.e., its mobility status). Exemplary components of the system 2 that are shown in FIG. 1 include an operating system kernel module 16, a page map file 18, a fragmentation monitor 20, logic 22 that implements fragmentation display collection and rendering, and a video generator 24.

The kernel module 16 is responsible for reading the page descriptors in the array 10 of FIG. 1 and acquiring the page mobility status information therefrom. The kernel module 16 may run within any conventional operating system that employs virtual memory management. One example of an operating system having this capability is the Linux® operating system. Any conventional hardware platform may be used to host the operating system 16, including the exemplary data processing hardware described below in connection with FIG. 4.

Figure 3:
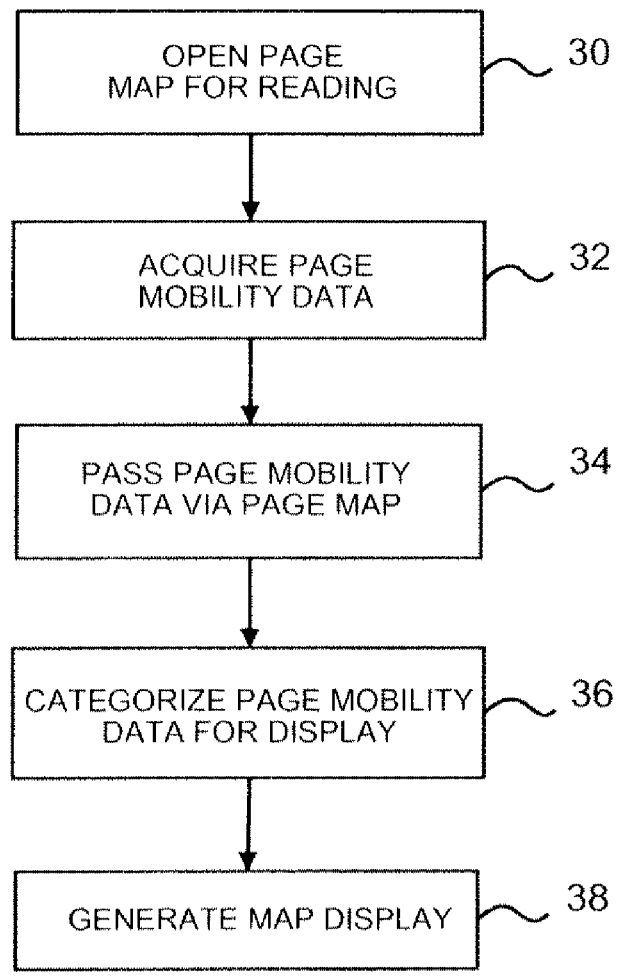
FIG. 3 is a flow diagram showing exemplary processing of the memory fragmentation visualization system of FIG. 1.

The page map 18 represents an in-memory distillation of the mobility status of the memory 4. If the module 16 resides in a Unix®-like operating system, such as Linux®, the page map 18 may be implemented as a file in the in-memory "/proc" file system. It may also be implemented as a character device. Further alternatives for transferring the mobility status information from kernel space to user space include other special file systems, pipes, sockets and system calls that call populate user space buffers, to name but a few. The fragmentation monitor 20 may be implemented as a user-level daemon application that periodically opens the page map 18 for reading. The page map read operation is shown by block 30 in FIG. 3. This read operation causes the kernel module 16 to gather the page mobility status information in the page descriptor array 10 and pass it to the fragmentation monitor 20 via the page map 18. These operations are respectively shown by blocks 32 and 34 in FIG. 3.

The fragmentation monitor 20 may categorize the mobility status information by processing it into simple codes that are assigned to the pages 8. For example, each mobility status field read from a page descriptor in the array 10 may be encoded as a single alpha-numeric character. The output of the fragmentation monitor 20 could then be a stream of characters, each of which represents the mobility status of a given page 8. The position of the mobility status code character of each page in the output character stream would correspond to the page frame number of the page, and thus the starting address of the memory area of the page. In a Unix®-like operating system, such as Linux®, the fragmentation monitor could output the stream of mobility status code characters by printing them to a standard output channel such as "stdout."

The logic 22 in FIG. 1 collects the page mobility status information output by the fragmentation monitor 20 and renders the map display 12 of FIG. 2. This operation is shown by block 38 in FIG. 3. For example, if the output of the fragmentation monitor 16 is a stream of mobility status code characters, the logic 22 would read each character and map it to one of the color codes shown in the map display 12. The logic 22 would then generate one or more picture elements of appropriate color at a location on the display map 12 that corresponds to the position of the character in the sequence of mobility status code characters generated by the fragmentation monitor 20. The display map 12 may also be stored as a file for future reference.

The map display 12 represents a static image of the memory 4 and is rendered from a single reading of the page map 18. If additionally desired, the fragmentation monitor 20 may read the page map 18 at regular intervals and the logic 22 may generate plural map displays 12 that are stored (e.g., in compressed form) for later analysis. The video generator 24 may use the stored display map information to generate a video that illustrates changes in mobility status over time. The advantage of this type of output is that a developer can identify at a glance why external fragmentation may be occurring based on the spread of colors in the video.

The map display 12 and/or a video comprising a sequence of such map displays may be used to advantage by an operating systems developer. For example, the developer could identify test cases that cause external fragmentation. For each test case that reproduces a particular fragmentation situation, an additional tool could be used to identify the stack trace that allocated a particular page involved in the fragmentation. This would help the developer identify long-lived pages responsible for fragmentation problems.

Figure 4:
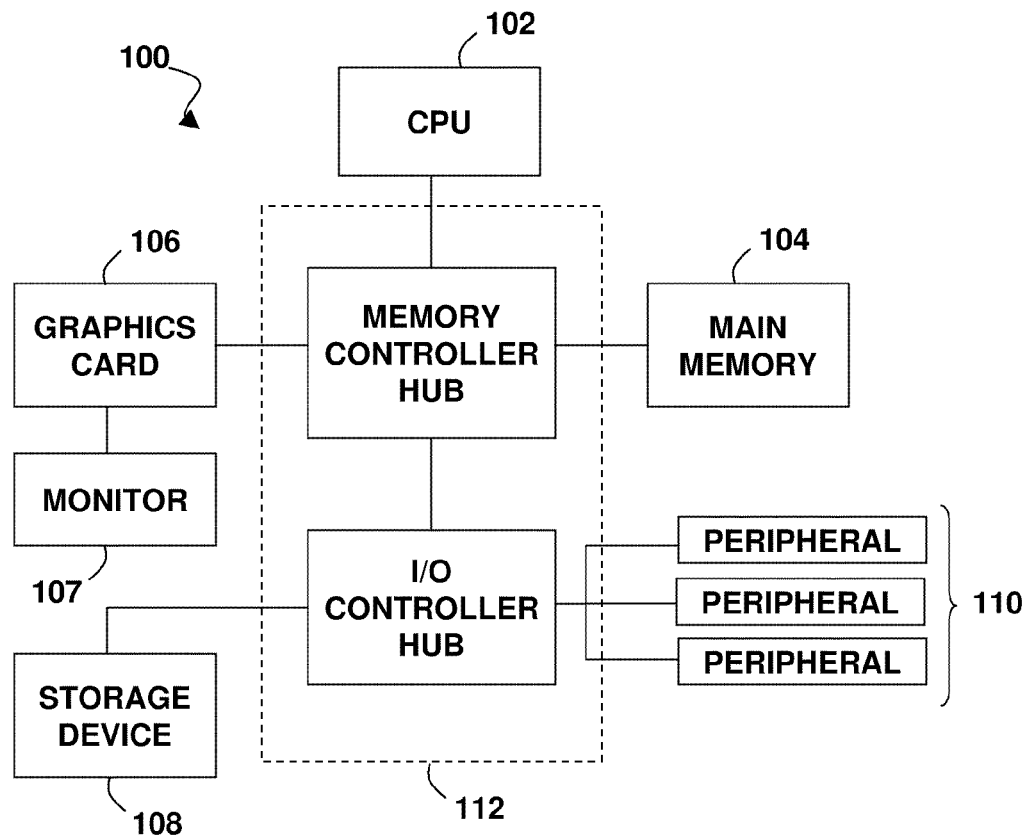
FIG. 4 is a functional block diagram showing exemplary data processing hardware that may be used to implement the memory fragmentation visualization system of FIG. 1.

Accordingly, a technique has been disclosed for visualizing memory fragmentation. It will be appreciated that the foregoing concepts may be variously embodied in any of a data processing system, a machine implemented method, and a computer program product in which programming logic is provided by one or more machine-useable media for use in controlling a data processing system to perform the required functions. Relative to a data processing system and machine implemented method, FIG. 4 illustrates an exemplary hardware environment 100 that may be used to implement the system 2 of FIG. 1. The hardware environment 100 includes one or more CPUs or other logic implementing hardware 102 and a main memory 104 that provide a processing core, an optional graphics card 106 for generating visual output information to an optional display monitor 107, a peripheral storage device 108, other peripheral devices 110, and a bus infrastructure 112 interconnecting the foregoing elements. If implemented in software, the system 2 of FIG. 1 may be loaded in the main memory 104. Various I/O (Input/Output) resources may be provided by the peripheral devices 110, which may include a USB bus controller, a SCSI disk controller, and a NIC. The optional monitor 107 may be implemented as part of a user interface for generating the map display 12.

Figure 5:
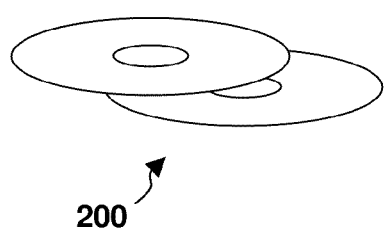
FIG. 5 is a diagrammatic representation of exemplary storage media that may be used in a computer program product implementation of software and/or firmware logic of the memory fragmentation visualization system of FIG. 1.

Relative to a computer program product having a machine-readable media and programming logic, exemplary data storage media for storing the programming logic are shown by reference numeral 200 in FIG. 5. The media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the logic of the system 2 of FIG. 1, either alone or in conjunction with another software product that incorporates the required functionality (such as an operating system distribution). The foregoing logic and data could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or medium (such as a network), or other entity that can contain, store, communicate, propagate or transport the programming logic for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for visualizing memory fragmentation in an addressable physical memory of a data processing system, comprising determining a mobility status of all memory pages in at least a portion of said physical memory, each of said memory pages representing a unit of said physical memory that is available for allocation in a virtual memory system using a virtual-to-physical memory mapping, said mobility status indicating an ability of each of said memory pages to be reclaimed or to have its data migrated around an address space of said physical memory in the event that reclamation or migration thereof is initiated, and generating a map display visually depicting said plural memory pages and said mobility status of each memory page.

2. A method in accordance with claim 1, wherein said map display depicts a memory address space distribution of said plural memory pages.

3. A method in accordance with claim 1, wherein said map display depicts a two-dimensional array of memory page blocks that each represent a contiguous memory area of interest comprising one or more of said memory pages, and wherein each of said memory pages is depicted by one or more picture elements.

4. A method in accordance with claim 3, wherein said mobility status is depicted by way of color codes assigned to said picture elements.

5. A method in accordance with claim 1, wherein said mobility status of said plural memory pages is depicted in said map display using a set of mobility status designations that include pinned, free, movable, reclaimable, movable-under-reclaim, per-cpu, compound, high-order-atomic, on a zone boundary, and a hole.

6. A method in accordance with claim 1, further including determining a mobility status of said plural memory pages at different times and generating a video display comprising plural map displays for each of said different times in order to illustrate changes in said mobility status.

7. A system for visualizing memory fragmentation in a physical memory, comprising:
   logic implementing hardware;
   an addressable physical memory;
   mobility determining logic adapted to determine a mobility status of all memory pages in at least a portion of said physical memory, each of said memory pages representing a unit of said physical memory that is available for allocation in a virtual memory system using a virtual-to-physical memory mapping, said mobility status indicating an ability of each of said memory pages to be reclaimed or to have its data migrated around an address space of said physical memory in the event that reclamation or migration thereof is initiated; and
   map generating logic adapted to generate a map display visually depicting said plural memory pages and said mobility status of each memory page.

8. A system in accordance with claim 7, wherein said map display depicts a memory address space distribution of said plural memory pages.

9. A system in accordance with claim 7, wherein said map display depicts a two-dimensional array of memory page blocks that each represent a contiguous memory area of interest comprising one or more of said memory pages, and wherein each of said memory pages is depicted by one or more picture elements.

10. A system in accordance with claim 9, wherein said mobility status is depicted by way of color codes assigned to said picture elements.

11. A system in accordance with claim 7, wherein said mobility status of said plural memory pages is depicted in said map display using a set of mobility status designations that include pinned, free, movable, reclaimable, movable-under-reclaim, per-cpu, compound, high-order-atomic, on a zone boundary, and a hole.

12. A system in accordance with claim 7, wherein said mobility determining logic is further adapted to determine a mobility status of said plural memory pages at different times and said map generating logic is adapted to generate a map display for each invocation of said mobility determining logic, and wherein said system further includes video generating logic adapted to generate a video display comprising plural map displays in order to illustrate changes in said mobility status.

13. A computer program product, comprising:
one or more computer useable storage media;
programming logic stored said computer useable storage media for programming a data processing platform for visualizing memory fragmentation in an addressable physical memory, as by:
determining a mobility status of all memory pages in at least a portion of said physical memory, each of said memory pages representing a unit of said physical memory that is available for allocation in a virtual memory system using a virtual-to-physical memory mapping, said mobility status indicating an ability of each of said memory pages to be reclaimed or to have its data migrated around an address space of said physical memory in the event that reclamation or migration thereof is initiated; and
generating a map display visually depicting said plural memory pages and said mobility status for each memory page.

14. A computer program product in accordance with claim 13, wherein said map display depicts a memory address space distribution of said plural memory pages.

15. A computer program product in accordance with claim 13, wherein said map display depicts a two-dimensional array of memory page blocks that each represent a contiguous memory area of interest comprising one or more of said memory pages, and wherein each of said memory pages is depicted by one or more picture elements.

16. A computer program product in accordance with claim 15, wherein said mobility status is depicted by way of color codes assigned to said picture elements.

17. A computer program product in accordance with claim 13, wherein said mobility status of said plural memory pages is depicted in said map display by a set of mobility status designations that include pinned, free, movable, reclaimable, movable-under-reclaim, per-cpu, compound, high-order-atomic, on a zone boundary, and a hole.

18. A computer program product in accordance with claim 13, wherein said programming means is further adapted to program said data processing platform for determining a mobility status of said plural memory pages at different times and generating a video display comprising plural map displays for each of said different times in order to illustrate changes in said mobility status.

19. A computer program product, comprising:
one or more computer useable storage media;
programming logic stored on said computer useable media for programming a data processing platform for visualizing memory fragmentation in an addressable physical memory, as by:
periodically acquiring mobility status information for all memory pages in at least a portion of said physical memory, each of said memory pages representing a unit of said physical memory that is available for allocation in a virtual memory system using a virtual-to-physical memory mapping, said mobility status information being determined from page descriptors for said memory pages and indicating an ability of each of said memory pages to be reclaimed or to have its data migrated around an address space of said physical memory in the event that reclamation or migration thereof is initiated;
generating an in-memory page map of said mobility status information;
processing said mobility status information in said page map by encoding it for display; and
generating a map display visually depicting said plural memory pages and said mobility status for each memory page.

20. A computer program product in accordance with claim 19, further including generating a video comprising plural map displays.

* * * * *